United States Patent
Matsuzaki et al.

(10) Patent No.: US 7,612,913 B2
(45) Date of Patent: Nov. 3, 2009

(54) WARNING SYSTEM AND WARNING METHOD

(75) Inventors: Masanori Matsuzaki, Yokohama (JP); Hiroshi Kaburagi, Yokohama (JP); Mitsuru Uzawa, Hachioji (JP); Reiji Misawa, Meguro-ku (JP); Osamu Iinuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/207,754

(22) Filed: Aug. 22, 2005

(65) Prior Publication Data

US 2006/0044591 A1    Mar. 2, 2006

(30) Foreign Application Priority Data

Aug. 24, 2004    (JP) ............................. 2004-244142

(51) Int. Cl.
*G06F 15/00* (2006.01)
*G06K 15/00* (2006.01)
*H04N 1/40* (2006.01)

(52) U.S. Cl. ...................... 358/1.9; 358/1.14; 358/2.1

(58) Field of Classification Search ................. 358/1.1, 358/1.9, 1.11–1.18, 2.1, 3.26, 3.27; 715/210, 715/269; 710/210, 269

See application file for complete search history.

(56) References Cited

U.S. PATENT DOCUMENTS 6,661,530 B1 * 12/2003 Munetomo et al. ......... 358/1.15
6,757,071 B1 *  6/2004 Goodman et al. .......... 358/1.13

FOREIGN PATENT DOCUMENTS

EP     1188569 A2 *  3/2002
JP  2001111577 A  *  4/2001

* cited by examiner

*Primary Examiner*—Edward L Coles
*Assistant Examiner*—Thierry L Pham
(74) *Attorney, Agent, or Firm*—Fitzpatrick, Cella, Harper & Scinto

(57) ABSTRACT

When there is a possibility where an undesirable printing result may be caused, a preview image useful for the check of the printing result is displayed, prior to an actual printing, to a user. Prior to the printing an image based on data after an image processing of an image data, it is determined whether or not there is a possibility in which an undesirable printing result may be caused based on the image data and, when it is determined that there is the possibility, a warning message is issued. When it is determined that there is a possibility in which an undesirable printing result may be caused, a printer driver simulates the image processing by the printing apparatus to prepare the data after the image processing. A display apparatus displays, prior to the printing of the image, a preview image based on the data after the image processing.

24 Claims, 11 Drawing Sheets

EXAMPLE OF CONVENTIONAL PROCESSING

EXAMPLE OF PROCESSING OF THE PRESENT INVENTION

WARNING SYSTEM AND WARNING METHOD

BACKGROUND OF THE INVENTION

1. Field of the Invention

The invention according to the present application relates to a warning system and a warning method by which, whether an undesirable printing result may be caused or not is determined prior to the printing of image data stored in a personal computer (PC) to issue a warning when there is a possibility of such a result.

2. Description of the Related Art

Recently, document data or the like has been digitized and output devices for outputting (or for printing) the data such as printers (printing apparatuses) have been widely used.

By the way, there is a case in which, due to the difference between the resolution of the printer as described above and the resolution of a monitor for displaying the contents to be printed by the printer, the printer outputs such a result that is not intended by a user who checked the contents to be printed via the monitor. Generally, the monitor resolution is lower than the printer resolution. Due to this reason, there is a case in which, when characters in an image that could be recognized to some extent are outputted via a printer for example, these printed characters may be difficult to be visually recognized or may show remarkable deterioration in the image quality.

To prevent this, systems have been conventionally suggested and implemented in which various means are used to warn a user that there is a possibility where the printer may output an undesirable result.

However, desirable image quality is different depending on a user. For example, even if it is warned that the printer may output an image having a low resolution, there is a possibility where this resolution may provide a sufficient image quality to a certain user. Thus, the warning system providing a mere warning as described above may cause a difficulty for a user to determine whether the details of the warning are acceptable for the user or not. Furthermore, in the case where a conventional application having a preview function for displaying the contents to be printed, the preview function only previews the contents to be printed based on the layout, failing to provide information for telling the image quality of the contents to be printed or whether the characters in the printed matter can be clearly read or not.

SUMMARY OF THE INVENTION

It is an objective of the present invention to provide a warning system and a warning method by which, when there is a possibility where an undesirable printing result may be caused, a preview image useful for checking the printing result can be displayed and provided, prior to an actual printing, to a user.

In a first aspect of the present invention, there is provided a warning system comprising:

determining means for determining, prior to printing by a printing apparatus of an image based on data obtained after an image processing of image data, whether or not there is a possibility in which an undesirable printing result may be caused based on the image data;

data forming means for simulating, when it is determined that there is the possibility in which the undesirable printing result may be caused, the image processing by the printing apparatus to form the data obtained after the image processing with respect to thus determined image data; and display means for displaying, prior to printing of the image by the printing apparatus, a preview image based on the data after the image processing.

In a second aspect of the present invention, there is provided a warning method comprising the steps of:

determining, prior to printing by a printing apparatus of an image based on data obtained after an image processing of image data, whether or not there is a possibility in which an undesirable printing result may be caused based on the image data;

simulating, when it is determined that there is the possibility in which the undesirable printing result may be caused, the image processing by the printing apparatus to form the data after the image processing with respect to thus determined image data; and displaying, prior to printing of the image by the printing apparatus, a preview image based on the data after the image processing.

According to the present invention, when there is a possibility where an undesirable printing result may be caused, an image processing by a printing apparatus is simulated prior to an actual printing by the printing apparatus to prepare data after the image processing of the image data so that a preview image is displayed based on the data. Specifically, not only the layout but also an image to be printed by the printing apparatus is prepared by the simulation to subject the image to a preview display. This can provide useful information to the user so that the user can determine whether to actually print the image or not. This can avoid a situation where, when there is a possibility in which an undesirable printing result for an image may be caused, the image is mistakenly printed because of an unavailability of the printing result. As a result, the printing operation can be performed with a higher efficiency and a lower cost.

The above and other objects, effects, features and advantages of the present invention will become more apparent from the following description of embodiments thereof taken in conjunction with the accompanying drawings.

DETAILED DESCRIPTION OF THE PREFERRED EMBODIMENT

Hereinafter, embodiments of the present invention will be described with reference to the drawings.

First Embodiment

Figure 1:
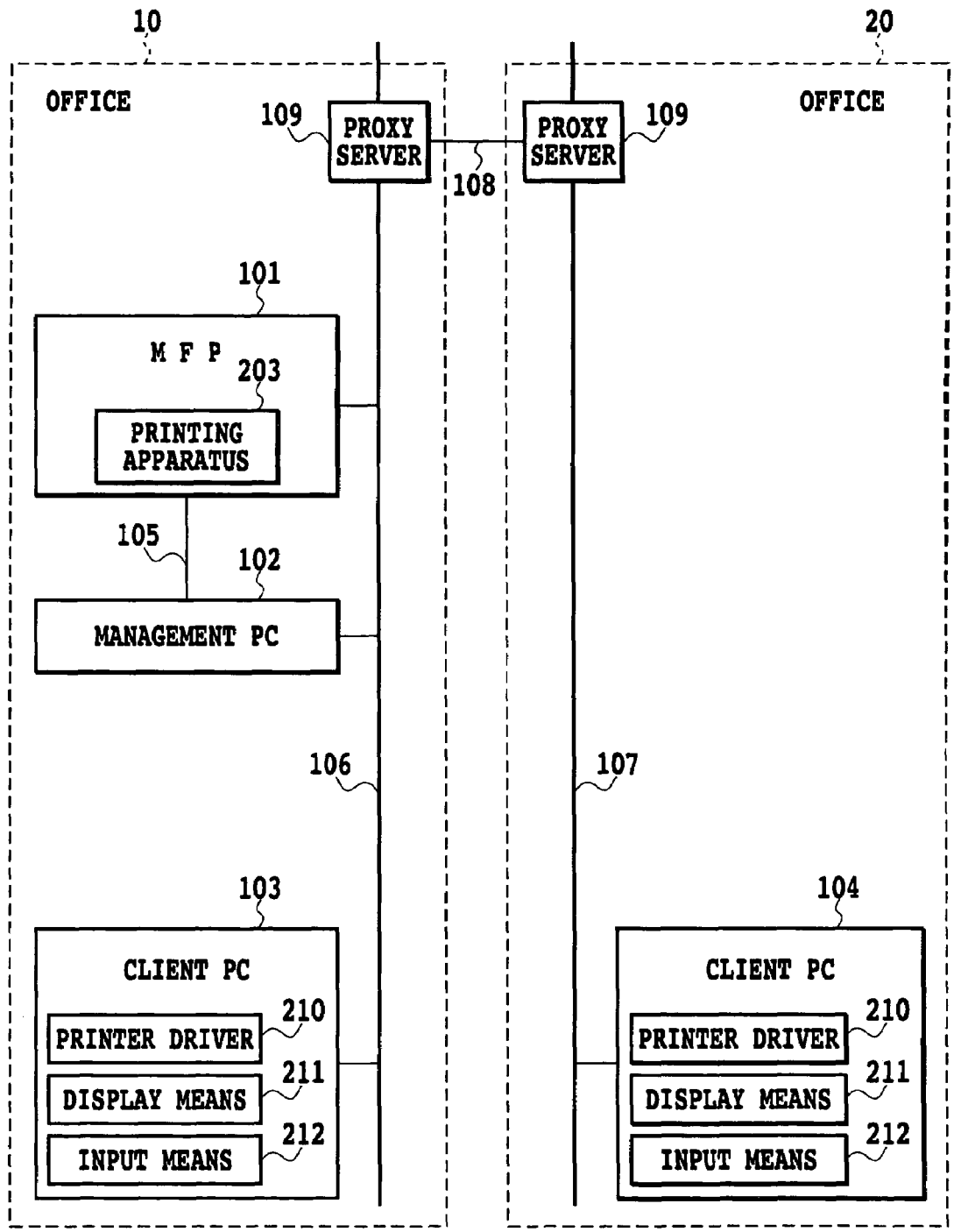
FIG. 1 illustrates a system configuration in the first embodiment of the present invention.

FIG. 1 is a block diagram illustrating an example of a configuration of a warning system according to the present invention. The warning system of this example is realized by an environment in which an office 10 is connected to an office 20 via an internet 108.

A LAN (Local Area Network) 106 structured in the office 10 is connected with a MFP (Multi-function Products; digital conposite printer) 101, a management PC (personal computer) 102, a client PC 103, and a proxy server 109. The LAN 106 in the office 10 and a LAN 107 in the office 20 are connected via the proxy server 109 to the Internet 108. In the present invention, the MFP 101 is mainly responsible for the output of an image (function as a printer (printing apparatus)). On the other hand, the management PC 102 includes an image storage means, an image processing means, a display means, and an input means and a part of them is integrated with the MFP 101. This management PC 102 also can include the warning processing function of the present invention. The client PCs 103 and 104 are PCs for providing image data that is desired to be outputted by a user and respectively include display means 211 and input means 212. At least one of the client PCs 103 and 104 includes a printer driver 210 (which will be described later). These client PCs include a warning processing function (which will be described later).

Figure 2:
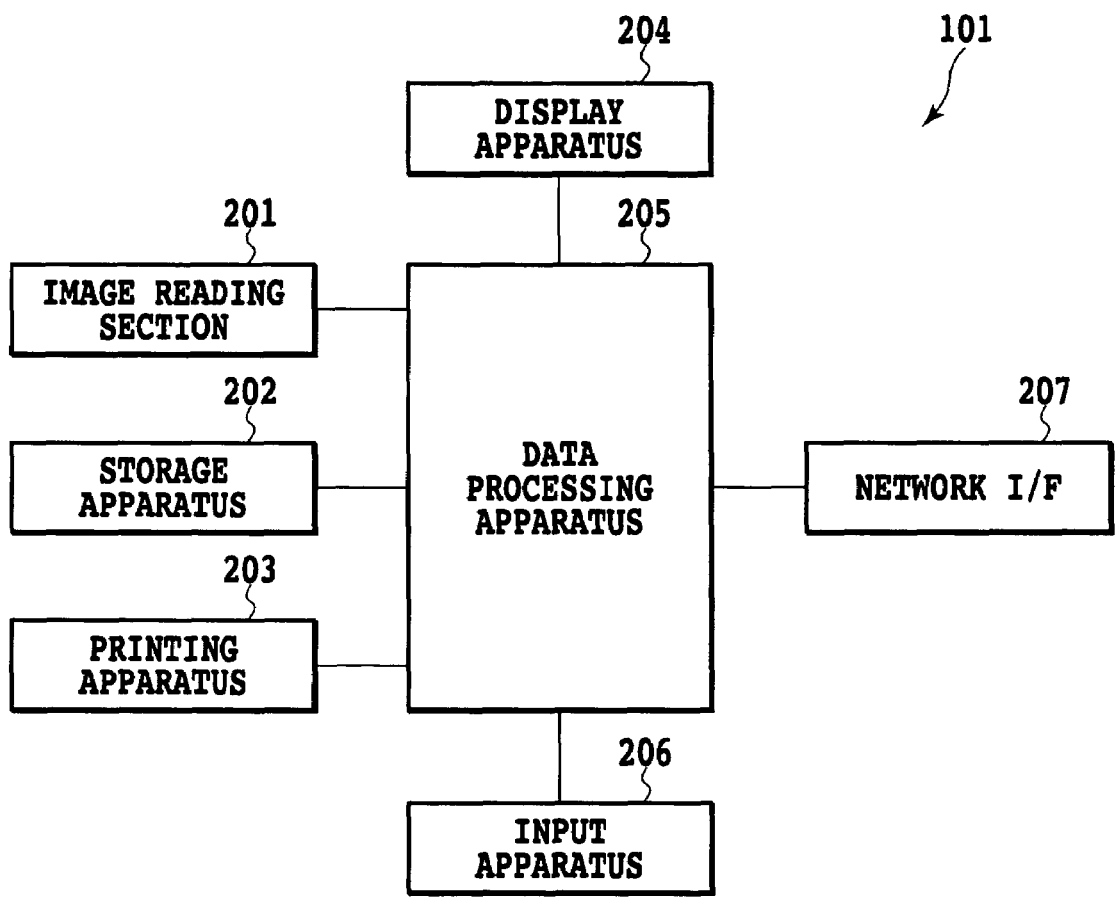
FIG. 2 is a block diagram of the MFP in FIG. 1.

FIG. 2 is a block diagram illustrating the MFP 101.

In FIG. 2, an image reading section 201 including an auto document feeder emits light from a light source (not shown) to a bundle of original images or one original image and a reflection image from the original image is focused by a lens on a solid-state image sensing device. Then, from the solid-state image sensing device, a raster-like image reading signal is obtained as image information having a density of 600 DPI. By a general copying function, this image signal is subjected to an image processing by a data processing section 205 for ovitaining a printing data. When the image on the original image is copied on a plurality of printing media, printing data for one page is temporarily stored in a storage apparatus 202 to subsequently output the printing data to the printing apparatus 203 successively to form images on the plurality of printing media. However, the copying function as described above is not used in this example.

An instruction from an operator to the MFP 101 is provided via an input apparatus 206. This input apparatus 206 includes a key operation section included in the MFP 101 and a keyboard and a mouse included as input means in the management PC 102. A set of operations instructed to the MFP 101 are controlled by a control section (not shown) in the data processing apparatus 205.

On the other hand, the display of the input status by the operator and the display of the image data being processed are performed by a display apparatus 204. The storage apparatus 202 is also controlled by the management PC 102. Data exchange between the MFP 101 and the management PC 102 and the control of the MFP 101 and the management PC 102 are performed by a network interface (I/F) 207 and the LAN 105 directly connected thereto.

The printing data outputted from the client PC 103 is sent from the LAN 106 via the network I/F 207 to the MFP 101. Then, the data is converted by the data processing apparatus 205 to be printable raster data. Thereafter, the converted data is printed by the printing apparatus 203 of the MFP 101 as an image on a printing medium. The warning processing function of the present invention relates to the function as described above.

Next, the flow of the warning processing in the printing processing will be described.

The warning processing function in the present invention can be included in the driver (printer driver) 210 for the printing apparatus 203. In the case of this example, the driver 210 is included in the client PC. The driver 210 uses the display means 211 and the input means 212 of the client PC to provide a function for switching ON/OFF of the warning function or a function for setting a button for determining the output result, for example. When the warning function is set to be ON by the display screen of the display means 211 and the input means 212, the warning processing is automatically provided when a printing is performed. In the warning processing, a warning message and a preview are displayed on the display means 211 as described later when an image to be printed includes a part for which the output result (printing result) may be undesirable. The same warning processing is also provided when the output result determination button on the display screen of the display means 211 is pushed by the input means 212. Specifically, when an image to be printed includes a part for which the output result may be undesirable, a warning message and a preview are displayed on the display means 211. In the preview, a part to be warned is displayed by a mark. In addition to the warning message, a warning beep also may be used.

Figure 11A:
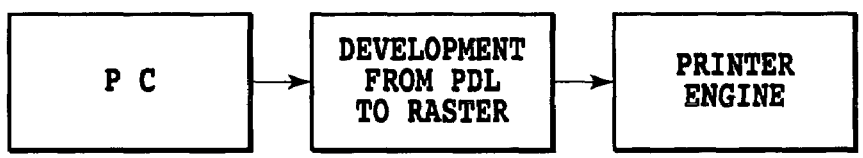
FIG. 11A illustrates an example of a conventional printing processing.
Figure 11B:
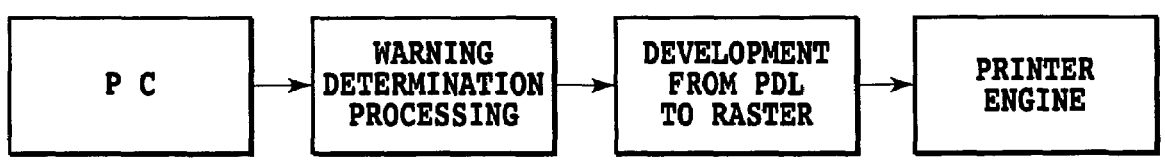
FIG. 11B illustrates an example of a printing processing by the present invention.

FIG. 11A and FIG. 11B illustrate the position in an image data output process at which the warning processing system of the present invention is provided.

When the warning processing system of the present invention is not incorporated, printing data in a PC is converted to data of PDL (Page Description Language) as shown in FIG. 11A to subject the data to a raster development, thereby transferring the data to a printer engine of a printer (printing apparatus). When the warning processing system of the present invention is incorporated on the other hand, type of an application of the PC is read prior to the conversion to PDL data as shown in FIG. 11B, thereby providing the warning processing. In the warning process, when a user judges not to perform printing, the image data output process is completed. When the user judges to perform printing, the printing data is converted to PDL data as in the conventional case to subject the data to the raster development, thereby transferring the data to the printer engine.

In this example, the printing apparatus 203 of the MFP 101 is used as an output device for printing an image. However, any output device may be used so long as the device has a function for outputting printing data sent from the PC.

(Outline of Warning Processing)

Next, the outline of the entire warning processing according to the present invention will be described with reference to FIG. 3. The warning processing of this example is realized by software included in the driver 210 for an output device included in the client PCs 103 and 104.

First, image data or document data to be printed (which will be also referred to as "printing data" hereinafter) is read (Step S301). Next, Step S302 reads the type of an output file. The type is used in a region separation processing (which will be described later). Next, Step S303 reads the information of the output device. The system of the present invention requires the information of the printing apparatus 203 of the MFP 101 in order to simulate the image processing performed by the printing apparatus 203 to realize a preview of the same type as that of the actual printing result. Next, Step S304 subjects the document data or image data to the region separation processing. This region separation processing separates the printing data into regions having predetermined attributes (e.g., character attribute, graphic attribute).

Next, Step S305 performs a determination process for a region to be warned in which whether or not the respective regions subjected to the region separation processing have a possibility where the output result (printing result) may be undesirable is determined. A region to be warned is a region having a possibility where the output result (printing result) may be undesirable. A region to be warned is a region for which the printing result may have a problem (e.g., region including a character having an excessively small size or a font that cannot be outputted), for example. A region to be warned is also a region for which the printing result may have a problem due to a large difference between the resolution of a to-be-printed image and the resolution of the printer (printing apparatus 203). When the former has a remarkably lower resolution than that of the latter for example, there is a risk in which the printing result is too unclear to be visually recognized. When the former has a remarkably higher resolution than that of the latter on the other hand, there is a risk in which the printing result has a low resolution, betraying the expectation by the user.

When Step S306 determines that there is a region to be warned, Step S307 prepares a preview image. This preview image is prepared by simulating the image processing performed by the output device. However, the image prepared by simulating the image processing performed by the output device has a resolution used by the printer (printing apparatus) 203. Thus, additional processing is performed for degrading, for example, the resolution of the simulated image to the resolution of the display means 211 of the client PC, thereby preparing a preview image. Then, the prepared preview image is displayed on the display means 211 (Step S308), thereby issuing a warning message. When Step S306 determines that there is no region to be warned, the processing is completed.

Although this example allows this warning processing to be performed by the client PC, this warning processing also may be internally performed in the management PC 102 or the MFP 101. In this case, additional processings for the transfer of printing data and the reception of the preview image are required. Although this example realizes the warning processing by the software included in the driver 210 for the output device, the warning processing also can be realized by an independent software for providing a preview prior to a printing operation.

Next, the respective processings in Steps S304, S305, S307, and S308 will be described in more detail.

(Region Separation Processing (Step S304))

Although this example uses attribute information incorporated into a file to provide the region separation processing, the method for the separation processing is not limited to a particular method. Generally, when an application for handling a document reads an associated file, the application reads attribute information incorporated therein to handle graphic data and text data separately. Thus, the region separation processing (Step S304) in this example also reads this attribute information to separate the to-be-printed data into regions having the attribute of "character", regions having the attribute of "graphic", and regions having the attribute of "photograph". In this specification, the term "character" means text data, the term "graphic" means the data prepared by combining graphics, and the term "photograph" means the data having a complicated shape that is drawn by a number of colors.

Figure 4:
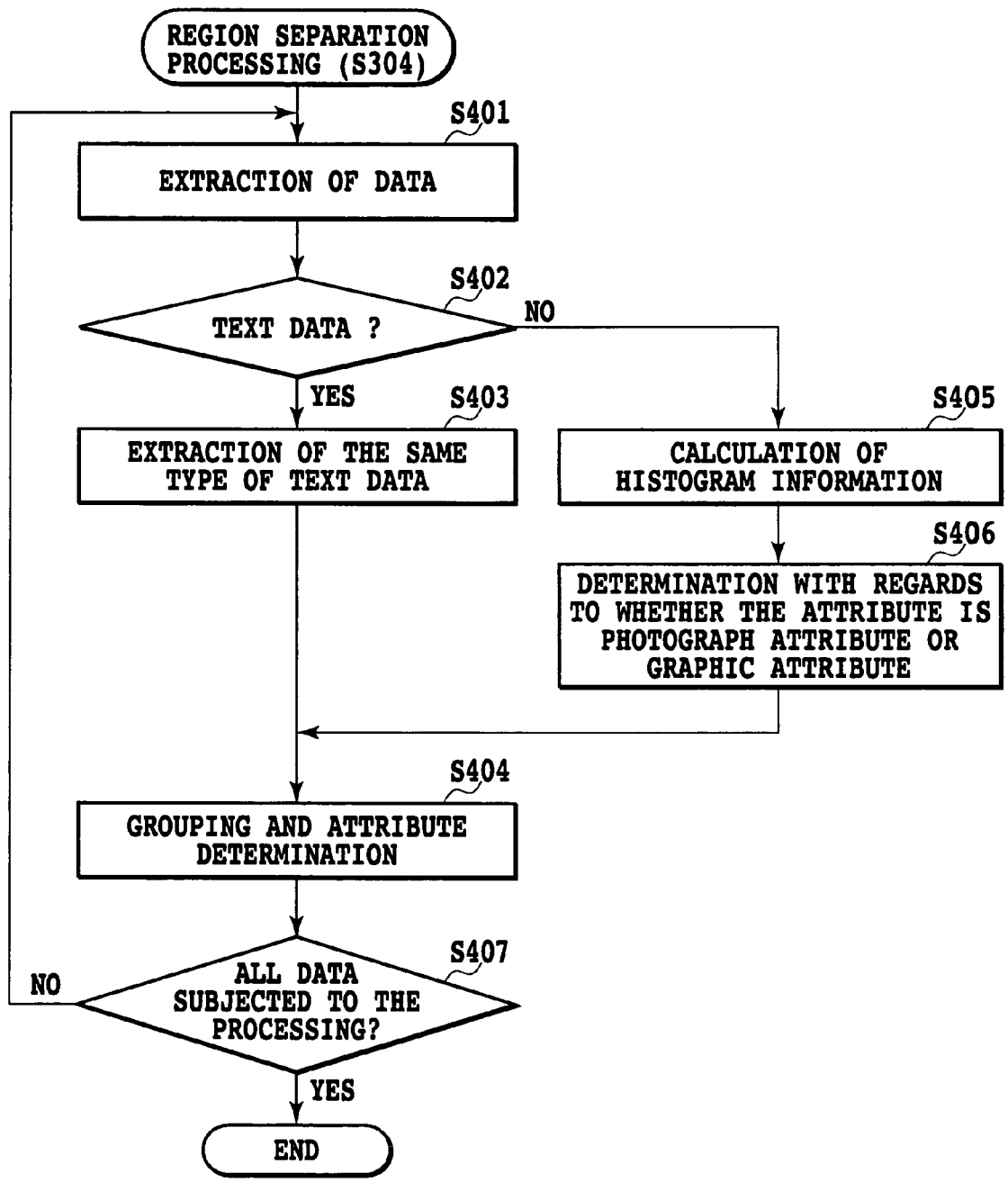
FIG. 4 is a flowchart illustrating a region separation processing in FIG. 3.

First, Step S401 of FIG. 4 extracts data (information regarding application). Next, whether the extracted data is text data or not is determined (Step S402). When the extracted data is text data, such text data that is continued from the text data and that is the same type of the text data is extracted (Step S403). The wording "the same type of the text data" means such text data that has the same font or size. A chunk of the text data thus extracted is assumed as one region and such regions are grouped to have the attribute of "character" (Step S404).

When Step S402 determines that the extracted data is not text data on the other hand, it means that the data is data of "graphic" or "photograph". Thus, a processing for determining whether the data is of "graphic" or "photograph" is required. Thus, histogram information is extracted (Step S405) and the histogram data is used to determine whether the data is of "graphic" or "photograph" (Step S406). Specifically, this determination is made based on peak values or distribution level in the histogram. When the histogram distribution is wide and there is no extreme high peak values, it is determined that a great number of colors are used, thereby determining that the data is of "photograph". In an opposite case, it is determined that the data is of "graphic". Then, in accordance with the result of the determination, the data is provided with attribute of "graphic" or "photograph" (Step S404). When a to-be-printed image is a monochrome image (single color image), the data is determined based on the brightness information instead of color information.

Then, Step S407 determines whether all the data is subjected to the region separation processing or not. When some of the data is not subjected to the processing yet, then the processing returns to Step S401. When all the data is subjected to the processing, then the processing is completed.

Figure 7:
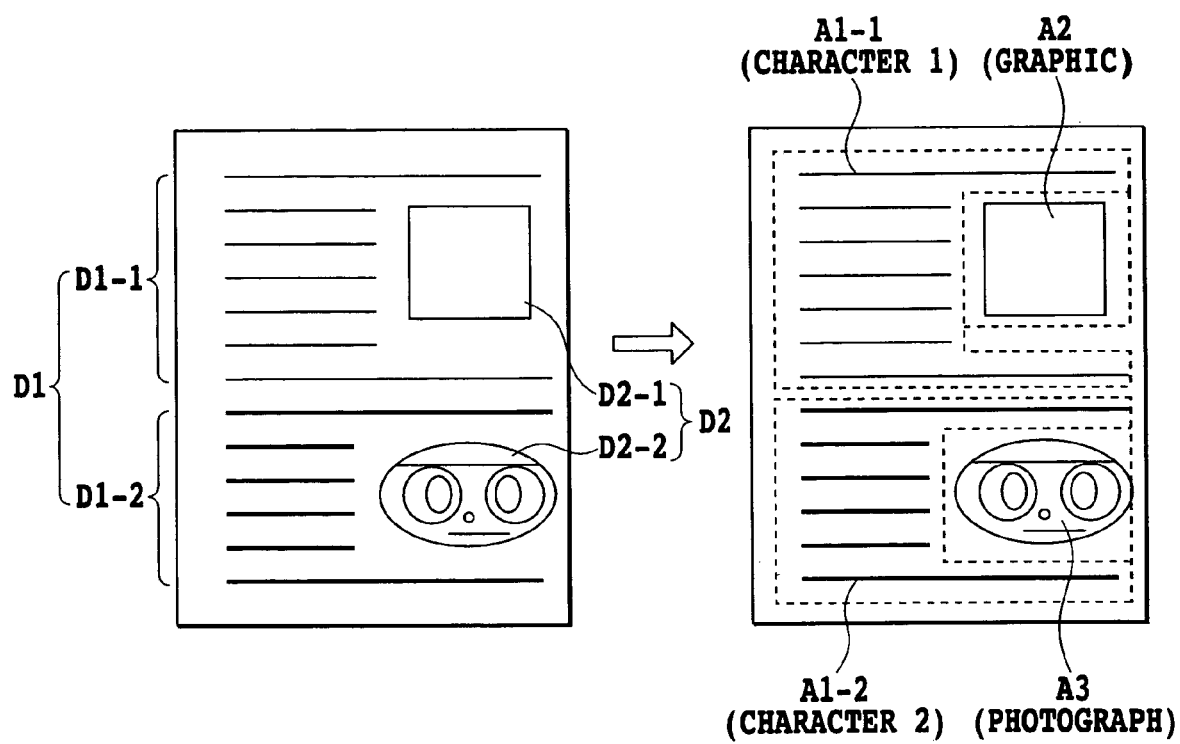
FIG. 7 shows the processing result of the region separation processing in FIG. 3.

FIG. 7 shows an example of the result of the region separation processing as described above.

In the case of this example, the data of an image to be printed is document data in which the text data D1 and the graphic data D2 coexist as shown in the left side of FIG. 7. In the text data D1, characters in the upper half data D1-1 have a different size from that of those in the lower half data D1-2. When the document data as described above is subjected to the region separation processing, the text data D1 is divided into the upper part and the lower part as shown in the right side of FIG. 7 to have the two regions A1-1 and A1-2 having the attribute of "character". On the other hand, the graphic data D2 is divided into the two pieces of data D2-1 and D2-2. The data D2-1 is assumed as the region A2 having the attribute of "graphic" because the histogram distribution is smaller than a predetermined value and the peak protrusion is extreme. On the other hand, the data D2-2 is assumed as the region A3 having the attribute of "photograph" because the histogram distribution is larger than a predetermined value and the peak protrusion is not extreme. In the example of FIG. 7, one piece of document data is divided to have the four regions A1-1, A1-2, A2, and A3.

These pieces of region separation information are used in a determination process for a region to be warned (which will be described later) (Step S305). Such a region separation processing is not required of course when the data attributes are previously divided or when the data attributes can be identified.

(Determination Process for a Region to be Warned (Step S305))

The determination process for a region to be warned is performed for all of the separated regions by the region separation processing (e.g., regions of "graphic", "character", and "photograph"). The method for the determination process for a region to be warned is not limited to a particular method.

Figure 5:
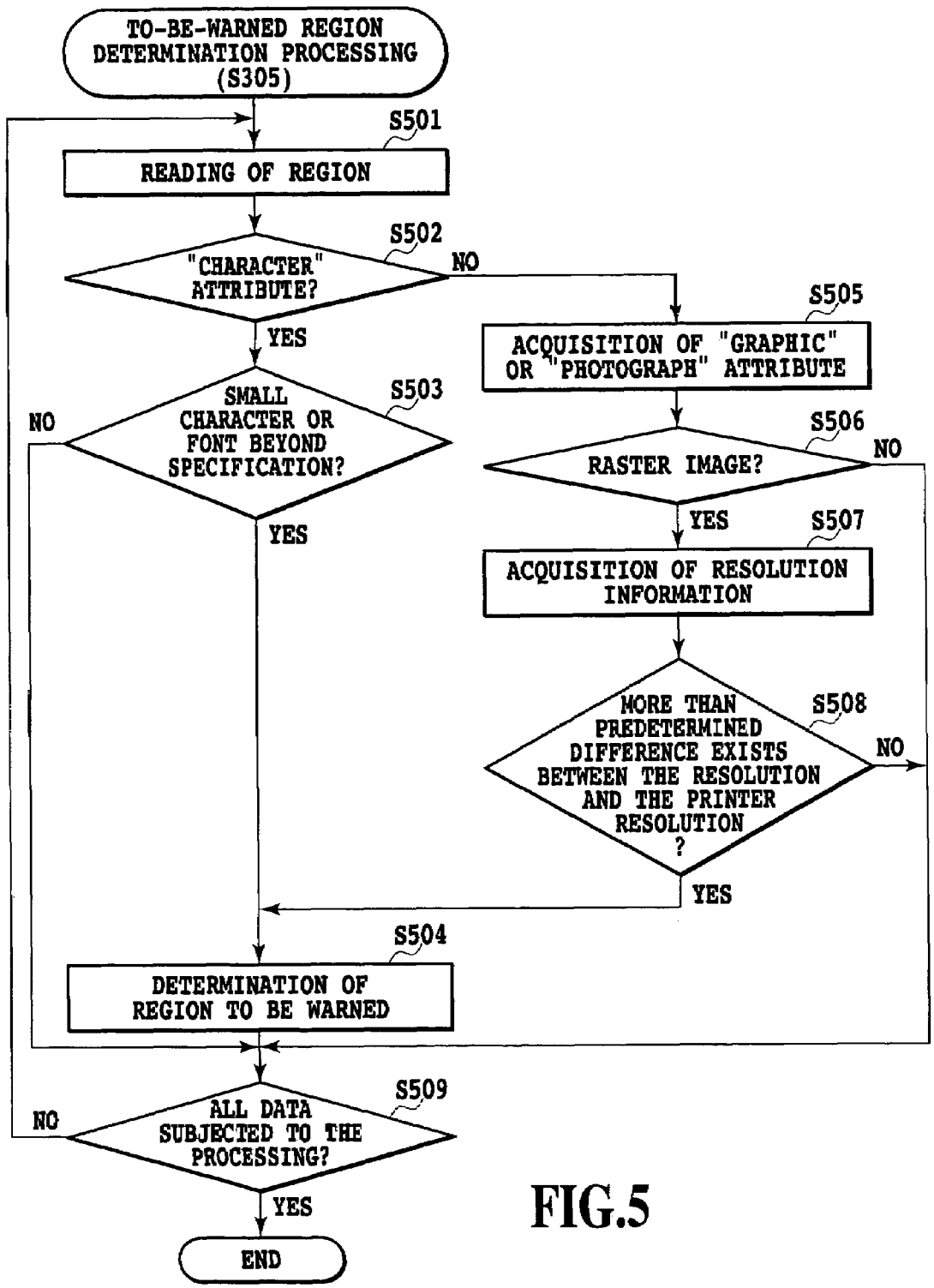
FIG. 5 is a flowchart illustrating a determination process for a region to be warned in FIG. 3.

FIG. 5 is a flowchart illustrating an example of the determination process for a region to be warned.

By the region separation processing of FIG. 4 as described above, the printing data is divided into the regions of "graphic", "character", and "photograph" and the attribute of them are clarified. Thus, Step S501 firstly reads the data of one region. Next, whether the attribute of the region is "character" or not (i.e., whether the region includes text data or not) is determined (Step S502). When the attribute of the region is "character", the processing proceeds to Step S503 to determine the size of the character and the font type. When the size of the character is too small to be displayed or when the font cannot be outputted by the output device, then the processing proceeds to Step S504 to determine that the region is a region to be warned. When the region is not such a region to be warned, the processing proceeds to Step S509. When not all the regions are subjected to the processing, the processing returns from Step S509 to Step S501 to read the data of the next region. When all the regions are subjected to the processing, then the processing in FIG. 5 is completed.

When Step S502 determines that the attribute of the data is not "character", the processing proceeds to Step S505 to obtain the attribute information in order to determine whether the attribute of the data is "graphic" or " " photograph. Next, Step S506 determines whether the data represents a raster image or not. When the data does not represent a raster image, then the data represents a vector image and thus can be displayed irrespective of the resolution. Thus, in this case, it is determined that the region is not a region to be warned to proceed to Step S509. When the data represents a raster image on the other hand, Step S507 obtains the information regarding the resolution of the data. Then, the processing proceeds to Step 508 to determine whether or not there is a difference larger than a predetermined value between the resolution of the data and the resolution of the printer (printing apparatus 203). When there is a difference larger than a predetermined value between the resolutions of them, then there is a possibility where the printing result may include an undesirable phenomenon such as a false contour, thus determining that the region is a region to be warned (Step S504). In this determination for determining whether a region is a region to be warned or not, the difference in the resolution (threshold value) as a criterion is separately prepared for a case where the data attribute is "graphic" and for a case where the data attribute is "photograph". The threshold value for "photograph" is basically lower than that for "graphic" because "photograph" is more influenced rather than "graphic" by the difference in resolution between the data and the printer. When Step S508 determines that the difference in resolution between the data and the printer is not equal to or higher than the predetermined value, then it is determined that the data is not a region to be warned to proceed to Step S509.

(Preview Image Preparation Processing (Step S307))

Figure 3:
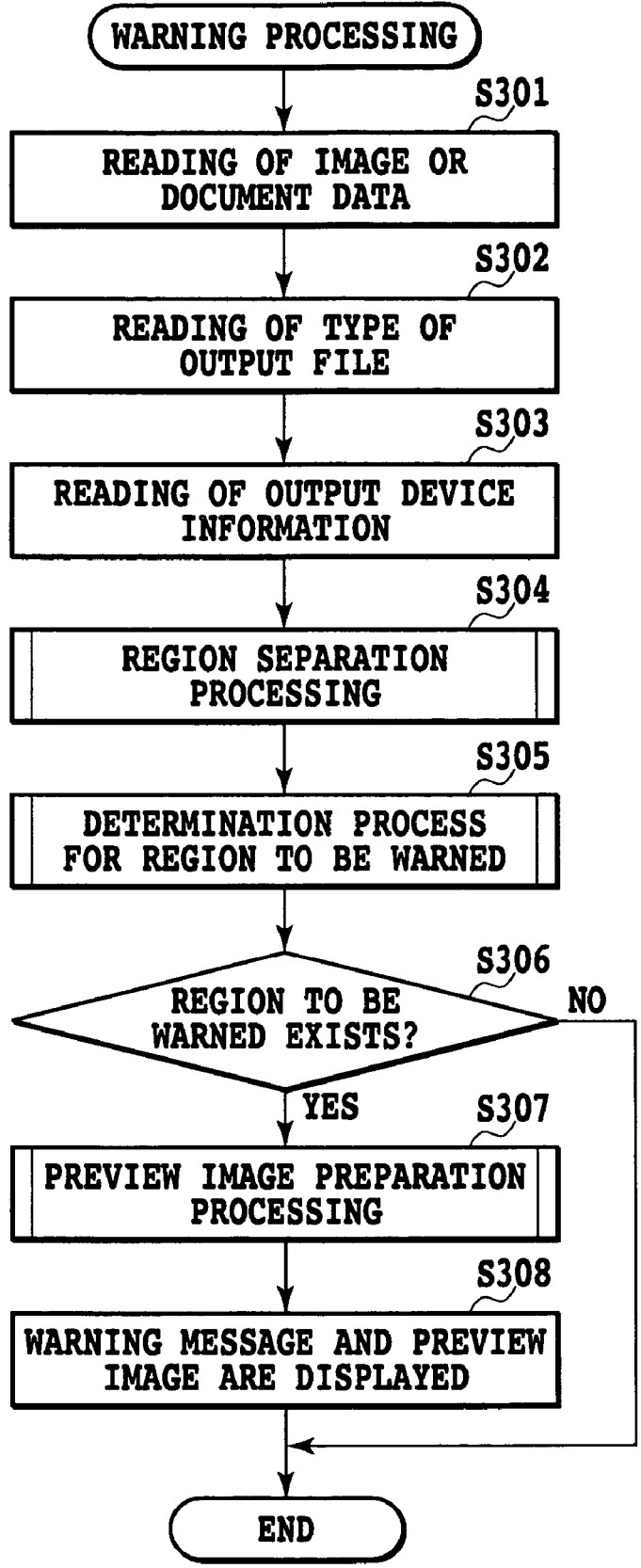
FIG. 3 is a flowchart illustrating a warning processing in the first embodiment of the present invention.
Figure 6:
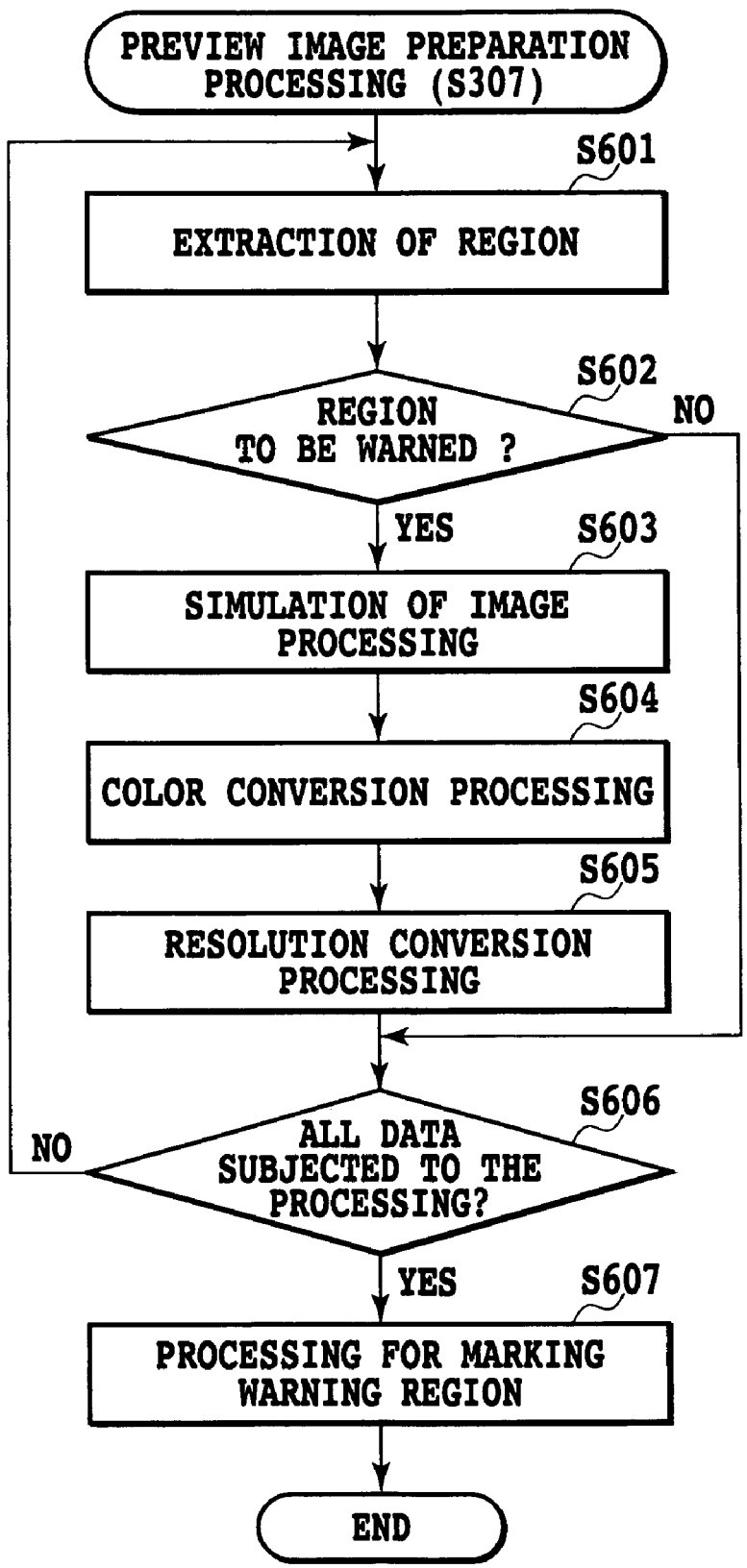
FIG. 6 is a flowchart illustrating a preview image preparation processing in FIG. 3.

When Step S306 of FIG. 3 determines that there is a region to be warned, then the preview image preparation processing as shown in FIG. 6 is performed.

First, the respective regions separated by the region separation processing of FIG. 4 (Step S304) are extracted (Step S601) to determine whether each extracted region is a region to be warned or not. When the region is a region to be warned, the processing proceeds to Step S603 to subject the region to an image processing simulation. This image processing simulation is a simulation in which an image processing performed by the printer (printing apparatus 203) is simulated by software. By performing this processing, a screen dot image at the final output (dot image at the printing) can be prepared. Although an image processing is different depending on an output device, the information regarding the output device obtained by Step S303 of FIG. 3 can provide the simulation of an image processing depending on the output device. When Step S602 determines that the region is not a region to be warned, the processing proceeds to Step S606. When an image processing is simulated by software, a lot of time is generally required for the calculation. Thus, the simulation can be omitted with regards to regions not requiring the simulation (i.e., regions other than a region to be warned) to reduce the processing time.

After the simulation of the image processing, Step S604 provides a color conversion processing. Generally, the printer (printing apparatus 203) has a color space different from a color space of the monitor (display means 211). Thus, a color conversion from the color space of the printer to the color space of the monitor is performed. The method for the color conversion may be any method.

Next, Step S605 provides a processing for converting the resolution of the printer. The printer (printing apparatus 203) generally has a resolution that is higher than the resolution of the monitor (display means 211). Thus, when a screen dot image is displayed on the monitor, the size of the image is too big to be accommodated within the display screen of the monitor. To solve this, the resolution of the image is reduced in accordance with the resolution of the monitor. In this reduction, in order to provide a matching between the size of the printing image and the size of the display screen of the monitor, an interpolation calculation such as the nearest neighbor method is used to reduce the number of pixels. This interpolation calculation may be performed by any method.

By the process as described above, an image similar to a screen dot image to be actually outputted (or to be actually printed) is prepared. However, the information regarding the image prior to the resolution conversion is also stored in consideration of a case where a user desires to see the region to be warned via magnification.

Thereafter, Step S606 determines whether all the regions are subjected to the processing or not. When some of the regions are not yet subjected to the processing, then these regions are subjected to the processing. When all the regions are subjected to the processing, then the processing proceeds to the next Step S607. Step S607 provides a marking processing to mark a region to be warned. Since region to be warneds are clarified by the determination process for a region to be warned (Step S305) of FIG. 5, each of the region to be warneds is marked by being surrounded by a rectangular mark for example. As a result, a user can clearly know an image part having a possibility where an unintended printing may be caused. A method for marking a region to be warned may be any method other than the one for marking the region with a rectangular mark (e.g., a method for showing such a region by blinking, a method for showing such a region by a mark of other shapes other than the rectangular one).

By the processing as described above, a preview image is prepared. When a sufficient processing speed is obtained, the determination processings in Steps S602 and S606 may be omitted and all the regions may be subjected to the simulation of the image processing.

(Preview Display Processing)

When the prepared preview image is displayed in Step S308 of FIG. 3, some users desire to enlarge a problematic part in the displayed image. In such a case, the data prior to the resolution conversion processing that was stored as described above (Step S605) is used to prepare an enlarged image of the part. When displaying such an image, the entire image may be enlarged or only a part of the image selected by the user also may be enlarged. Alternatively, only the marked region to be warned specified by the user also may be enlarged.

Second Embodiment

In the above-described embodiment, the warning processing function is realized by the softwares in the client PCs 103 and 104. In the second embodiment, the warning processing function is realized by the management PC 102 as an external controller attached to the output device.

When the warning processing function is realized by the management PC 102, prior to the transmission of the PDL data from a client PC, the document data or image data itself is sent from the client PC to the management PC 102. When there is a possibility of an unintended printing result, the management PC 102 sends the preview data and the determination result to the client PC. When there is no possibility of an unintended printing result, then the management PC 102 sends only the determination result to the client PC.

Figure 8:
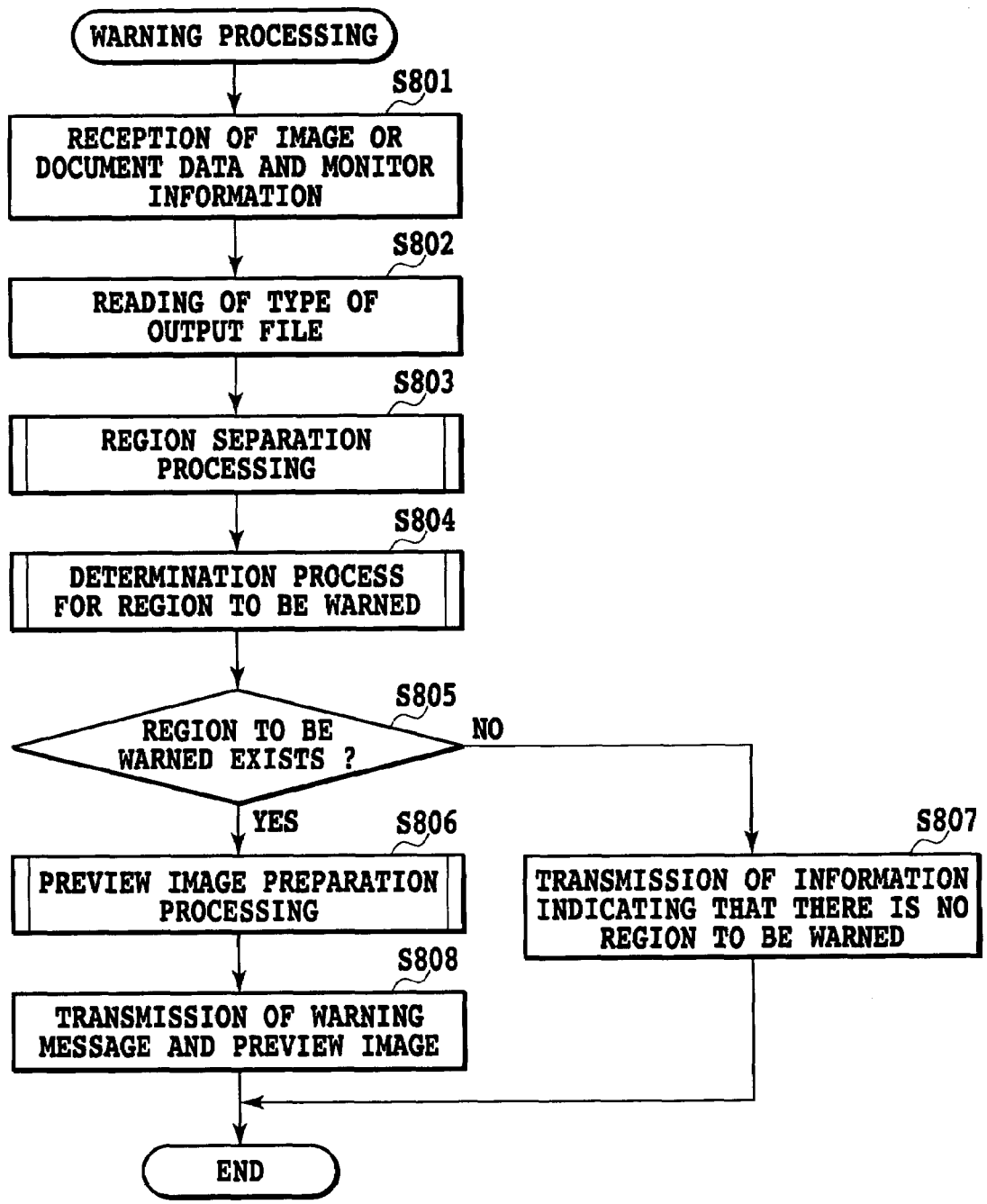
FIG. 8 is a flowchart illustrating a warning processing in the second embodiment of the present invention.

FIG. 8 is a flowchart illustrating a warning processing in which the management PC 102 (i.e., external controller attached to the output device) is used.

First, the management PC 102 receives the image data or document data sent from the client PCs 103 and 104 (Step S801). The management PC 102 also receives the monitor information (information regarding the display means 211). The monitor information is used by the color conversion processing in a preview image preparation processing (which will be described later). Next, Step S802 reads the format of the output file. In the above-described first embodiment, the warning processing is operated in the client PC and thus a preview image cannot be prepared without the information regarding the type of the output device. However, in this embodiment, the warning processing is operated in the management PC 102 as an external controller attached to the output device and thus the type of the output device is obvious. Thus, this embodiment can omit a processing for reading the information regarding the type of the output device.

Next, Step S803 performs a region separation processing. This processing is the same as the region separation processing of FIG. 4 (Step S304) in the above-described embodiment. Next, Step S804 performs a determination process for a region to be warned. This processing is the same as the determination process for a region to be warned of FIG. 5 (Step S305) in the above-described embodiment. Then, Step S805 determines whether there is a region to be warned or not. When there is a region to be warned, the processing proceeds to Step S806. Step S806 prepares a preview image as in the preview image preparation processing of FIG. 6 (Step S307) in the above-described embodiment to send the preview image to the client PC. When the preview image is prepared, the color conversion processing of FIG. 6 (Step S604) uses the monitor information sent from the client PC. Then, Step S808 sends the warning message and the preview image to the client PC, thereby completing the processing. The client PC causes the received data to be displayed by the display means 211.

When Step S805 determines that there is no region to be warned, then the processing proceeds to Step S807 to send, to the client PC, the information indicating that there is no region to be warned.

The warning also may be performed by a warning beep other than a message. When a user desires to see an expanded image display, then the user sends an expansion request message from the client PC to the management PC 102 (external controller). When receiving the message, the warning processing function in the management PC 102 performs the expansion processing to send the result to the client PC.

This embodiment eliminates the need for providing a warning processing function in each client PC. The warning processing function also may be provided not in a controller connected to outside (management PC 102) but in the MFP 101.

Third Embodiment

This embodiment realizes the warning processing function by using a print server.

Figure 9:
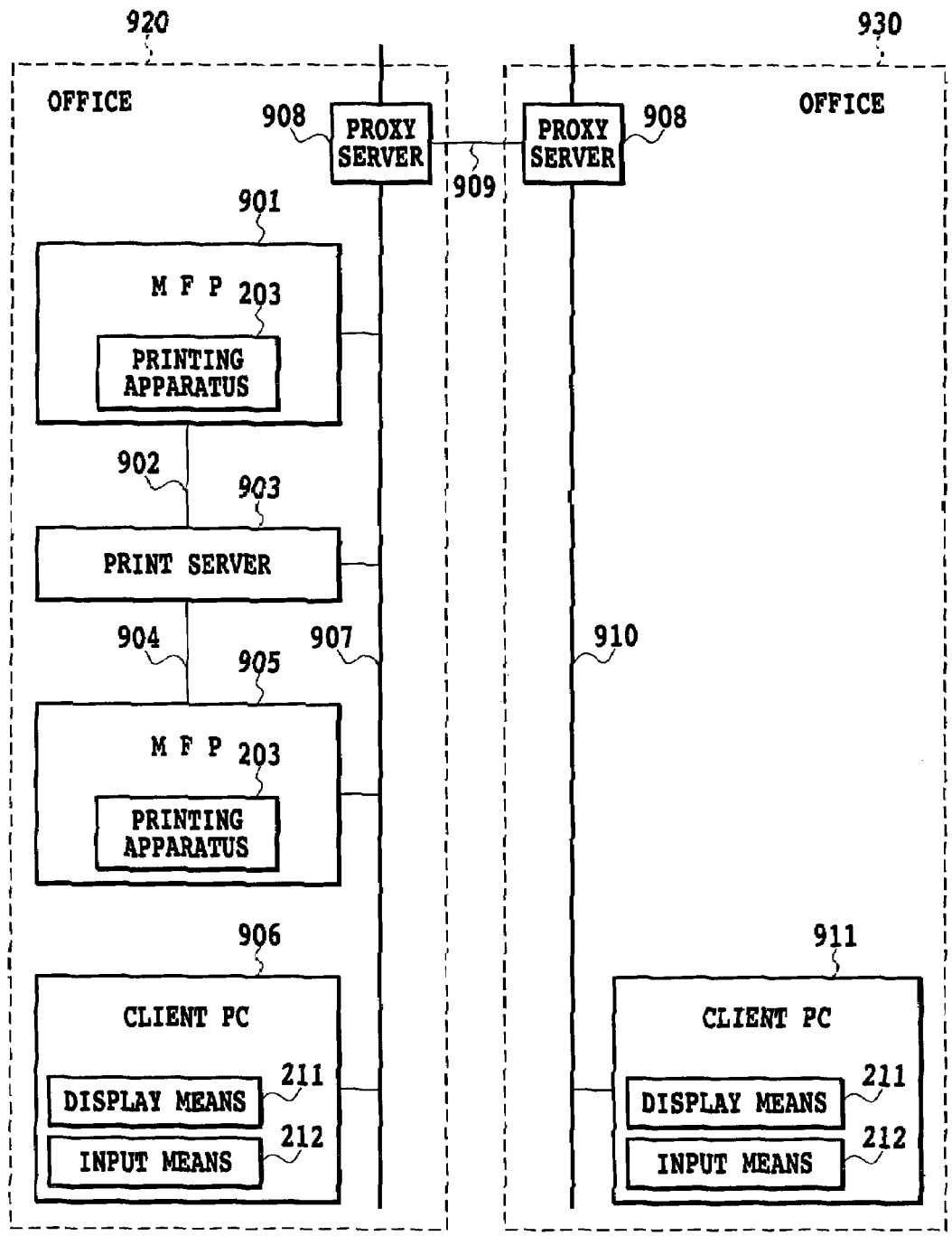
FIG. 9 shows a system configuration in the third embodiment of the present invention.

FIG. 9 illustrates a system configuration in this example. As in the above-described embodiment FIG. 1, this embodiment is realized by an environment in which an office 920 is connected to an office 930 via an Internet 909. A LAN 907 structured in the office 920 is connected with a client PC 906 and a Proxy server 908. The LAN 907 is also connected with a print server 903, which is the difference between the third embodiment and the embodiment of FIG. 1. This print server 903 is connected via LANs 902 and 904 with MFPs 901 and 905. The LAN 907 in the office 920 and a LAN 910 in the office 930 are connected via the Proxy server 908 with the Internet 909. The client PCs 906 and 911 are a PC for outputting image data desired to be outputted (or printed) by the user. In this embodiment, the warning processing function is not included in the PCs 906 and 911 and is included in the print server 903. Although this example uses the printing apparatus 203 of the MFP as an image output apparatus, other output devices also may be used.

Figure 10:
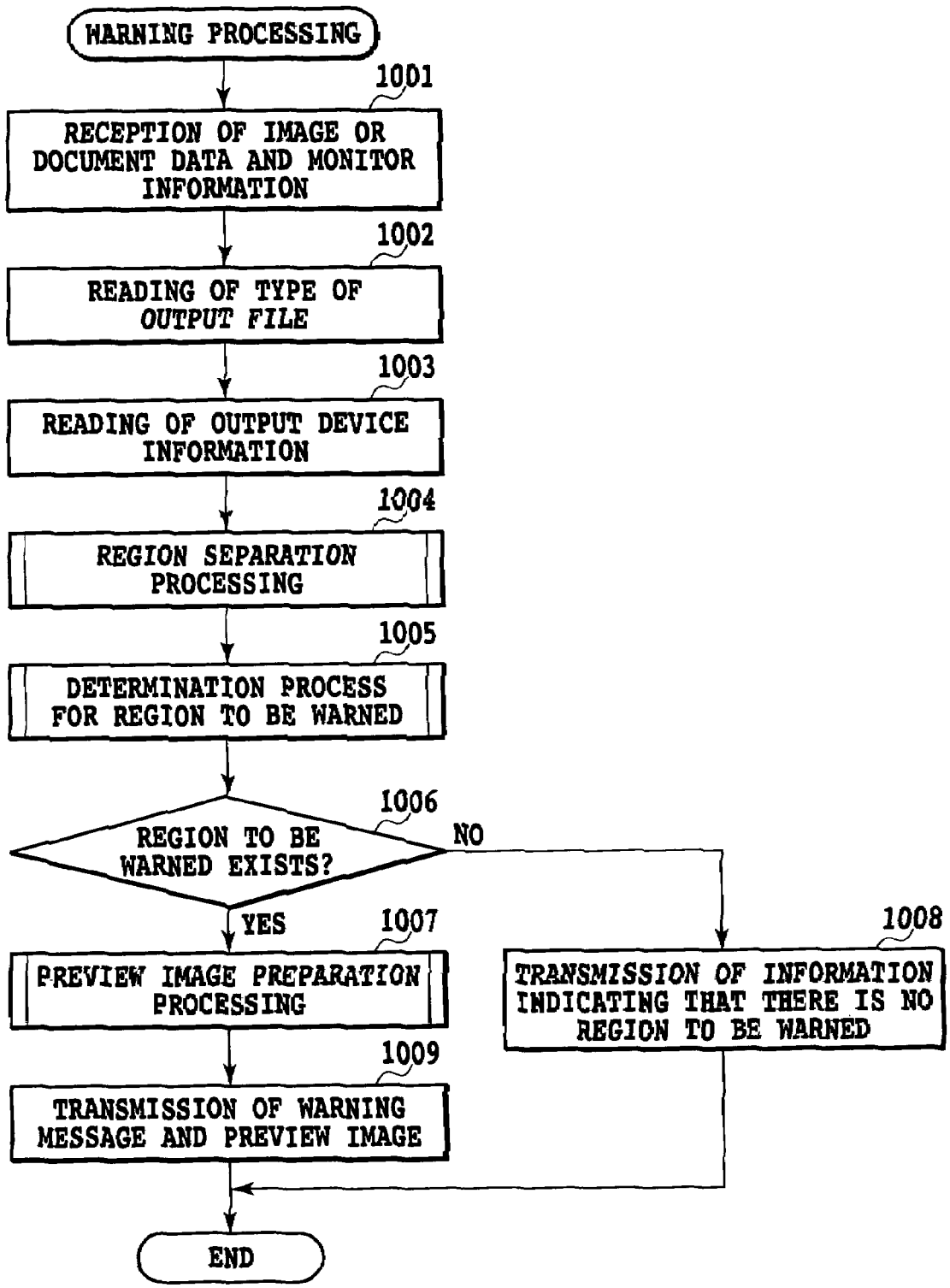
FIG. 10 is a flowchart illustrating a warning processing in the third embodiment of the present invention.

FIG. 10 is a flowchart illustrating the warning processing using the printer server 930.

As in the above-described second embodiment using the external controller (management PC), image data or document data and monitor information (information regarding the display means 211) are received from the client PC (Step S1001). Next, Step S1002 reads the format of the output file in the same manner as in the case where the external controller is used. Next, Step S1003 reads the information regarding the output device. When the MFP is connected to the external controller (management PC) as in the case of the above-described second embodiment, there was no need to read the information regarding the output device because the printing apparatus 203 of the MFP is determined as an output device. However, the print server 903 at this point of time does not know which output device is used for the output (printing) and thus requires the information regarding the output device.

The processing after Step S1004 is the same as the processing after Step S803 of FIG. 8 in the second embodiment using the external controller (management PC). Specifically, Step S1004 performs the region separation processing and Step S1005 performs the determination process for a region to be warned. Then, Step S1006 determines whether there is a region to be warned or not. When there is no region to be warned, Step S1008 transmits the information indicating that there is no region to be warned. When there is a region to be warned, Step S1007 performs the preview image preparation processing and Step S1009 transmits a warning message and a preview image. By incorporating the warning processing function in the print server 903 as described above, the warning processing can be provided via any client PC.

When it is desired that an expanded image is displayed on the display means 211 as in the case where the external controller (management PC) is used, an expansion request message is sent from the client PC to the print server 903. When the message is received, the warning processing function in the print server 903 performs a processing for expanding the image to send the result to the client PC.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2004-244142 filed Aug. 24, 2004, which is hereby incorporated by reference herein.

What is claimed is:

1. A warning system comprising:
    determining means for determining, prior to printing by a printing apparatus of an image based on data obtained after an image processing of image data, whether or not there is a possibility in which an undesirable printing result may be caused based on the image data;
    region separation means for separating the image data into regions having different attributes;
    determination means for determining whether each of the regions having different attributes may cause an undesirable printing result;
    data forming means for simulating, when it is determined that there is the possibility in which the undesirable printing result may be caused, the image processing by the printing apparatus to form the data obtained after the image processing with respect to thus determined image data; and
    display means for displaying, prior to printing of the image by the printing apparatus, a preview image based on the data after the image processing.

2. A warning system according to claim 1, wherein the data forming means converts a resolution of the data after the image processing depending on a resolution of the display means.

3. A warning system according to claim 1, wherein the data forming means also forms data for displaying the preview image in a expanded manner.

4. A warning system according to claim 1, wherein the display means displays the preview image and a warning message simultaneously.

5. A warning system according to claim 1, wherein the warning system includes means for generating a warning beep when the display means displays the preview image.

6. A warning system according to claim 1, wherein the regions having different attributes are regions having at least one attribute of a character attribute, a graphic attribute, and a photograph attribute.

7. A warning system according to claim 6, wherein the region separation means separates a text data part included in the image data as a region having the character attribute.

8. A warning system according to claim 6, wherein the determination means determines that, when the region having the character attribute includes a to-be-printed character smaller than a predetermined size and/or a to-be-printed character having a font that cannot be printed by the printing apparatus, there is a possibility where an undesirable printing result may be caused.

9. A warning system according to claim 6, wherein the region separation means separates a graphic data part included in the image data, based on a histogram of the graphic data part, into regions having the graphic attribute or the photograph attribute.

10. A warning system according to claim 6, wherein the determination means determines that, when the region having the graphic attribute or the photograph attribute includes a raster image which is a graphic or photograph image to be printed and when the graphic or photograph image to be printed has a resolution that is different from the resolution of the printing apparatus by the difference equal to or higher than a predetermined value, there is a possibility where an undesirable printing result may be caused.

11. A warning system according to claim 1, wherein the display means attaches, when displaying the preview image, an identification mark to a region that is determined to have a possibility in which an undesirable printing result may be caused.

12. A warning system according to claim 1, wherein the data forming means is included in any one of the printing apparatus, a printer server of the printing apparatus, or a computer connected to the printing apparatus.

13. A warning system according to claim 1, wherein the region separation means and the determination means are included, together with the data forming means, in any one of the printing apparatus, a printer server of the printing apparatus, or a computer connected to the printing apparatus.

14. A warning method comprising the steps of:
    using a computer to perform the steps of:
        a determining step of determining, prior to printing by a printing apparatus of an image based on data obtained after an image processing of image data, whether or not there is a possibility in which an undesirable printing result may be caused based on the image data;
        a region separation step of separating the image data into regions having different attributes;
        a determination step of determining whether each of the regions having different attributes may cause an undesirable printing result; and
        a data forming step of simulating, when it is determined that there is the possibility in which the undesirable printing result may be caused, the image processing by the printing apparatus to form the data after the image processing with respect to thus determined image data; and
    using a display to perform the step of:
        a display step displaying, prior to printing of the image by the printing apparatus, a preview image based on the data after the image processing.

15. A warning method according to claim 14, wherein the data forming step converts a resolution of the data after the image processing depending on a resolution of the display means.

16. A warning method according to claim 14, wherein the data forming step also forms data for displaying the preview image in an expanded manner.

17. A warning method according to claim 14, wherein the display step displays the preview image and a warning message simultaneously.

18. A warning method according to claim 14, further comprising generating a warning beep when the display step displays the preview image.

19. A warning method according to claim 14, wherein the regions having different attributes are regions having at least one attribute of a character attribute, a graphic attribute, and a photograph attribute.

20. A warning method according to claim 19, wherein the region separation step separates a text data part included in the image data as a region having the character attribute.

21. A warning method according to claim 19, wherein the determination step determines that, when the region having the character attribute includes a to-be-printed character smaller than a predetermined size and/or to-be-printed character having a font that cannot be printed by the printing apparatus, there is a possibility where an undesirable printing result may be caused.

22. A warning method according to claim 19, wherein the region separation step separates a graphic data part included in the image data, based on a histogram of the graphic data part, into regions having the graphic attribute or the photograph attribute.

23. A warning method according to claim 19, wherein the determination step determines that, when the region having the graphic attribute or the photograph attribute includes a raster image which is a graphic or photograph image to be printed and when the graphic or photograph image to be printed has a resolution that is different from the resolution of the printing apparatus by the difference equal to or higher than a predetermined value, there is a possibility where an undesirable printing result may be caused.

24. A warning method according to claim 14, wherein the display step attaches, when displaying the preview image, an identification mark to a region that is determined to have a possibility in which an undesirable printing result may be caused.

* * * * *